United States Patent [19]

Visser

[11] Patent Number: 5,428,947
[45] Date of Patent: Jul. 4, 1995

[54] FRUIT PICKER

[76] Inventor: Tom R. Visser, 1052 S. Riverdale Rd., Avon Park, Fla. 33825

[21] Appl. No.: 40,630

[22] Filed: Mar. 31, 1993

[51] Int. Cl.⁶ ............................................. A01D 46/24
[52] U.S. Cl. ...................................... 56/328.1; 56/330
[58] Field of Search .................. 56/333, 328.1, 329, 56/330, 335, 337, 338, 339

[56] References Cited

U.S. PATENT DOCUMENTS

| | | | |
|---|---|---|---|
| 3,380,235 | 4/1968 | Smith et al. | 56/328.1 |
| 3,417,558 | 12/1968 | Granger | 56/328.1 |
| 3,827,221 | 8/1974 | Chen | 56/328.1 |
| 4,163,356 | 8/1979 | Robbins et al. | 56/328.1 |
| 4,192,125 | 3/1980 | Reynolds et al. | 56/328.1 |
| 4,202,158 | 5/1980 | Edwards | 56/329 X |
| 4,208,860 | 6/1980 | Edwards | 56/328.1 |
| 5,161,358 | 11/1992 | Crunkelton | 56/328.1 |

Primary Examiner—Terry Lee Melius
Attorney, Agent, or Firm—Allen, Dyer, Doppelt, Franjola & Milbrath

[57] ABSTRACT

A compact fruit picker is mounted on the three-point lift of an agricultural tractor and utilizes the power take-off of the tractor to operate a reciprocating series of probe arms having spring-loaded picking fingers mounted on each arm to penetrate the tree canopy and remove fruit as the arm is withdrawn. The picked fruit is caught in a device positioned below the picker.

4 Claims, 7 Drawing Sheets

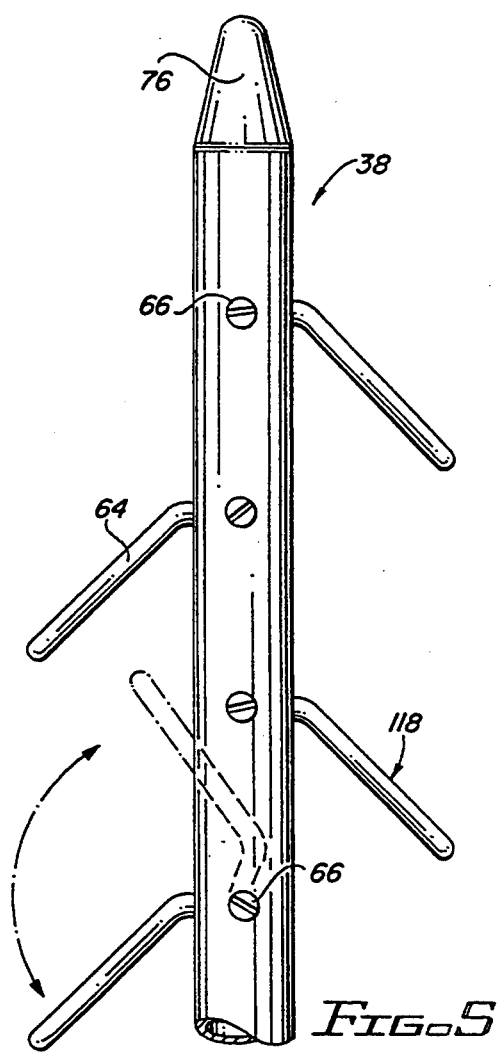
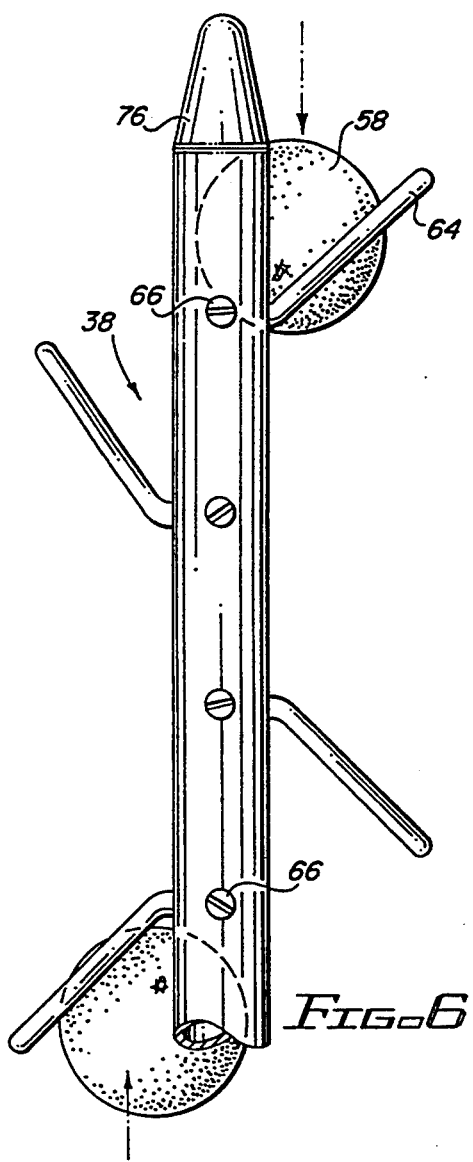
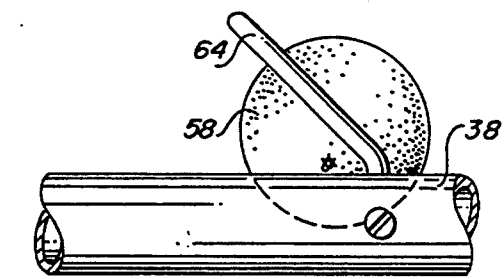
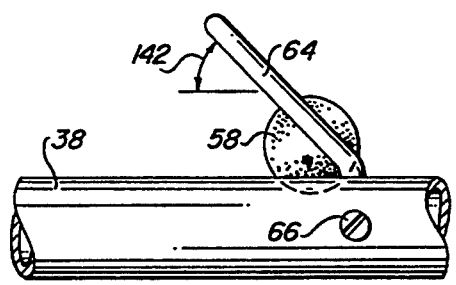
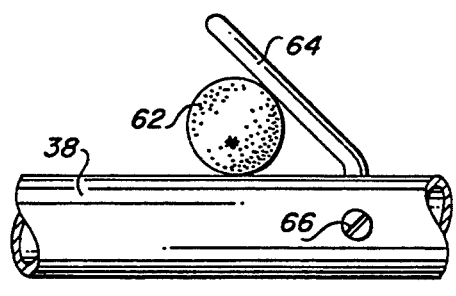

FRUIT PICKER

BACKGROUND

1. Field of Invention

This invention relates to mechanical fruit pickers, specifically to a device that is used for mechanical picking of fruit from fruit trees.

2. Discussion of Prior Art

The citrus industry as an example has abandoned all efforts to pick fruit mechanically. Lots of money and time was spent on various methods of picking fruit.

Some methods previously considered usually also require the aide of chemical abscission. These chemicals are not available, require additional cost of application and the action of the chemical is greatly influenced by uncontrollable climatic factors.

Usually the shaking of a tree result in some mutilation of the trunk, limbs or roots. Some "hard to pick" fruit like oranges are not easy to remove by vigorously shaking the tree.

High tech computer controlled robotics are cost prohibitive, slow and not considered a solution by the industry.

The method of hooking the stem end of a fruit has been employed in U.S. Pat. No. 3,827,221 to Pictiaw Chen, May 4, 1973, had limitations relating to rigid probes, material strength and shape of the picking finger. The same also failed to present a constant torque swing away action during an encounter with a tree limb. The increasing torque of a torsion spring as an example may cause the hook scrape and damage the bark or break the tree limb.

The rotating probes as described in U.S. Pat. No. 4,163,356 to R. J. and D. W. Robbins, Mar. 9, 1977 was further complicated by a meshing gear drive to rotate probes that can result in extreme tree mutilation and again no provision was made to bypass limbs.

OBJECTS AND ADVANTAGES

Accordingly, besides the objects and advantages of this fruit picker of the present patent, several objects and advantages are:

(a) To provide a fruit picker that is rugged and simple with very low operating cost.

(b) This mechanism requires very little energy in comparison to the pneumatic or mechanical shaker or even vacuum activated picking processes.

(c) This picking device utilizes an ordinary agricultural tractor. Consequently the grower can utilize standard farm equipment.

(d) Seeing that this mechanism is mounted on the back of a tractor, it can easily be maneuvered in the grove.

(e) A further object of this invention is to provide a fruit picker which releases the fruit from the tree and collects the same concurrently. No additional big and difficult-to-position-catcher is required. This picking device employs a catching device integrated with the picker so that every fruit that is picked will also be collected and temporarily stored on the catcher. The catcher can then be emptied into a standard bin or tub presently being utilized by the industry. No additional handling or hauling facilities will be required to employ this machine.

(f) This picker requires only one operator and mechanizes the picking process completely.

(g) It is a further object of this invention to provide a means of picking that will cause the minimum mutilation to the tree. The flexible probes, spring loaded hooks and pathfinder cones reduce the mechanical damage done to the tree to a minimum. Compare U.S. Pat. Nos. 4,163,356 and 3,827,221 where no flexibility of the probes is provided.

(h) It is also an object to not only to effectively detach the fruit from the tree but likewise has a selecting ability between small immature fruit and the large mature fruit.

(i) Light weight, low friction, and cheap material is used to manufacture the probes. Quick and easy replacement of the probes is allowed for as yet another object of this fruit picker.

(j) No abscission chemicals are required to be applied in advance of picking the fruit.

(k) Another object of this invention is to provide a picking device of which the size can be matched with to suit the tree size. It further incorporates an easy to position attachment to adjust the positioned of the picker. This has the added benefit to always penetrate the canopy in a radial alignment in order to further reduce damage to the tree.

(l) Another further object of the present picker is to provide means of transferring picked fruit to a bin of or trailer thereby reducing the handling procedures of fruit now commonly practiced.

Further objects and advantages of my invention will become apparent from a consideration of the ensuing description and drawings.

BRIEF DESCRIPTION OF THE DRAWINGS

FIG. 5 is a plan view of the probe and a single action arrangement of the picker fingers and shows how a finger can swing away and be retracted inside the probe.

FIG. 6 is a plan view of the probe and a double action arrangement of the picker fingers.

FIG. 8 is a plan view of a finger sized to pick larger mature fruit.

FIG. 9 is a plan view of a finger sized to pick larger mature fruit and not picking the smaller immature fruit.

FIG. 10 is a plan view of a finger sized to pick smaller mature fruit.

LIST OF REFERENCE NUMERALS

| 30 | Tractor |
|---|---|
| 32A | Hydraulic cylinder for positioning toolbar |
| 32B | Hydraulic cylinder for positioning hitch |
| 34 | Positioning double hinge |
| 36 | Toolbar |
| 38 | Probe assembly |
| 40 | Catcher |
| 42 | Catcher funnel |
| 44 | Hydraulic cylinder for tilting |
| 46 | Hydraulic motor |
| 48 | Roller chain |
| 50 | Carriage |
| 52 | Guide |
| 54 | Footrest |
| 56 | Tilt frame |
| 58 | Picked fruit |
| 60 | Fruit tree |
| 62 | Unpicked fruit |
| 64 | Picker finger |
| 66 | Countersunk bolt |
| 68 | Endless latex band |
| 70 | Pivoting sleeve (counter sunk) |
| 72 | Pivoting sleeve (threaded) |
| 74 | Elongated slot hole |
| 76 | Pathfinder cone |
| 78 | Tree limb |
| 80 | Drive shaft |
| 82 | Sprocket |
| 84 | Attachment bracket |
| 86 | Carriage mounting |
| 88 | Telescopic support |
| 90 | Fruit bin |
| 92 | Picking-catching device (diagrammatic) |
| 94 | Typical planting bed |
| 96 | Typical drainage furrow |
| 98 | Normal position |
| 100 | Extended position |
| 102 | Forward position |
| 104 | Backward position |
| 106 | Bearing roller |
| 108 | Hydraulic relief valve |
| 110 | Tractor hitch |
| 112 | Tree trunk |
| 114 | Mounting sleeve (Base end of picker finger) |
| 116 | Typical cross sectional area |
| 118 | Picker finger assembly |
| 120 | Pivot bolt |
| 122 | Drive unit top |
| 124 | Drive unit bottom |
| 126 | Main drive chain top |
| 128 | Main drive chain bottom |
| 130 | Shaft bearing |
| 132 | Raceway |
| 134 | Catcher frame |
| 136 | Hitch bracket |
| 138 | Tilt hinge |

-continued

| 140 | Picker-catcher assembly. |
|---|---|
| 142 | Angle of attack |
| 144 | Throat size |

SUMMARY OF THE INVENTION

The Fruit Picker is a compact picking device typically mounted on the three point lift of an agricultural tractor, utilizing its power to operate a reciprocating series of probes having spring loaded picking fingers mounted in it to penetrate the tree canopy and withdraw from it again. The picking of the fruit takes place during the movement of the probes relative to the tree. The picked fruit is caught in a device which is positioned below the picker. The picked fruit is dumped into a container at regular intervals.

DESCRIPTION OF FIGS. 1-6, 11-17 and 24.

Figure 1:
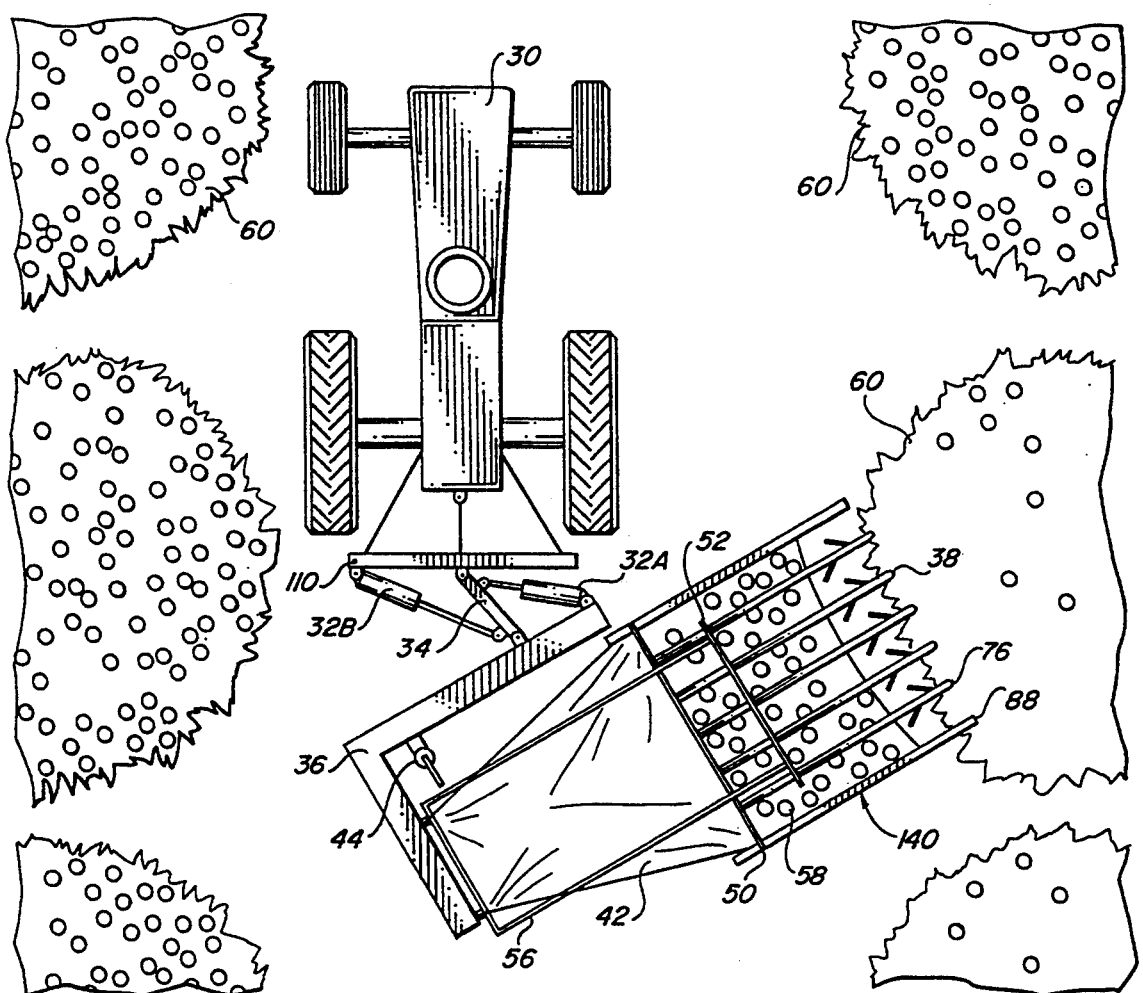
FIG. 1 shows a plan view of the picker in action.
Figure 2:
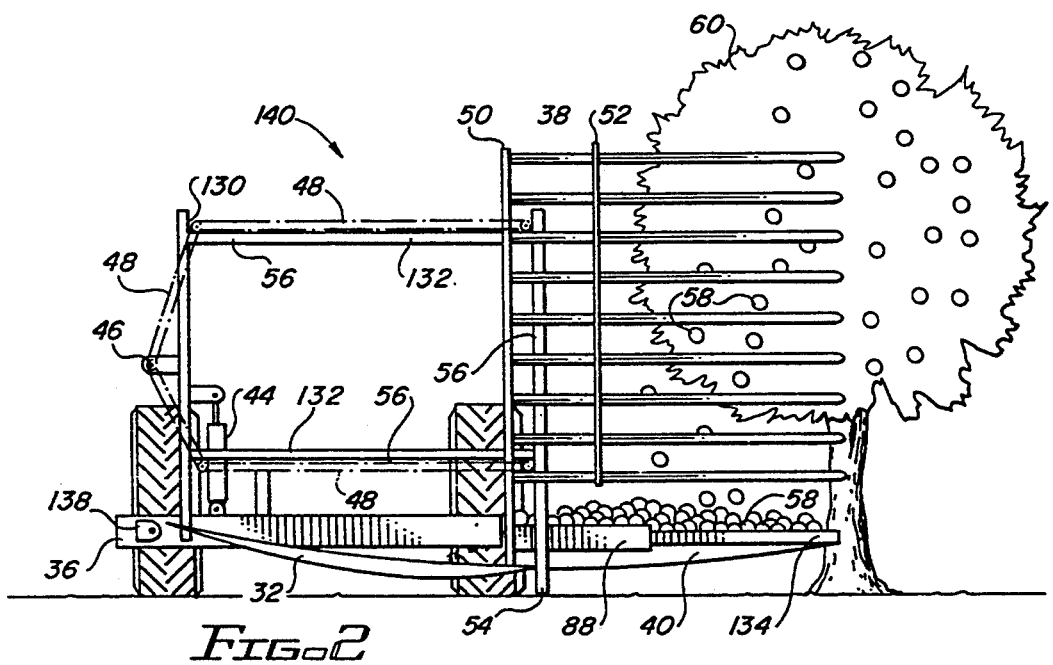
FIG. 2 shows an end view of the picker in action.
Figure 14:
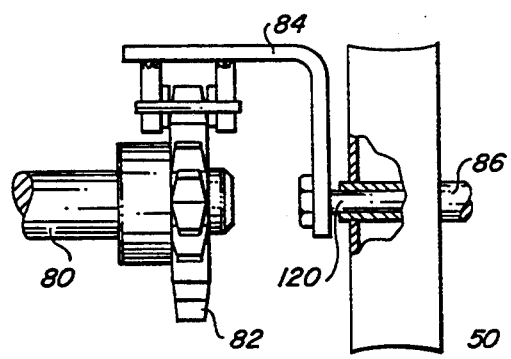
FIG. 14 is an end view of the attachment device.

In reference to FIG. 2 a series of probes 38 having picking fingers 64 mounted thereon are connected to a carriage 50 and are guided by a guide 52. The carriage 50 is connected via a chain drive mechanism 122 and 124 and an hydraulic motor 46 shown on FIG. 11. A Bracket 84 shown in FIG. 14, is connected to the drive mechanisms 122 and 124. Guide 50 is connected to a frame 56. This frame 56 is pivotal connected to a toolbar 36. FIG. 1 illustrates how toolbar 36 is connected via a double hinge 34 to a tractor hitch 110. A catcher frame 134 is connected to the carriage by a hitch bracket 136.

A typical embodiment or the fruit picker of the present invention is illustrated in FIG. 1 (top view) and FIG. 2 (end view).

Figure 3:
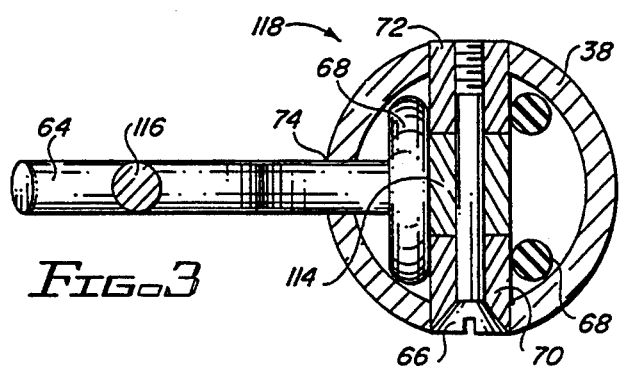
FIG. 3 is a cross sectional view of the probe and picker finger, the plane of which is indicated by line 3—3 in FIG. 4.

In reference to FIG. 3 which shows a cross sectional view of the a flexible light weight arm, prong or probe 38. A curved lever, hook or picker finger 64 of having uniform cross sectional diameter in at least one direction has a cylindrical base mounting sleeve 114 permanently attached to it. The inner diameter of the mounting sleeve 114 shown as the diameter is such than the countersunk bolt 66 fits in it. The length the mounting sleeve 114 is equal to the diameter of the picker finger 64 shown as cross sectional area 116. The mounting sleeve 114 is pivotal mounted on the probe 38. A pipe, tube or pivot sleeve 70 is convex shaped at the one end in order to accommodate the head of a countersunk bolt 66 to fit into the convex shaped end thereof. The outer diameter of the pivoting sleeve (countersunk) 70 is smaller than two holes diametrically opposed in the wall of the probe 38 in order to allow pivotal movement. The length of the pivoting sleeve (countersunk) 70 is equal to or just smaller than half the outer diameter of the probe 38 minus half the cylindrical length of the mounting sleeve 114. Another pipe, tube or pivoting sleeve 72 has the same outer diameter than the pivoting sleeve (countersunk) 70, the same length but threaded on the inside in order to allow the thread of the countersunk bolt 66 to mate the threaded end of the pivoting sleeve (threaded) 72. The countersunk bolt 66 fits through the pivoting sleeve (countersunk) 70, the mounting sleeve 114 and mates into the pivoting sleeve (threaded) 72 to hold them together as a unit. The picker finger 64 extends through a slot or elongated hole 74, in the side wall of the probe 38. The position of the slotted hole 74 is parallel to the longitudinal axis of the probe 38 and the length sufficiently equal to the length of the curved part of the picker finger 64. The width of the slotted hole 74 is substantially equal to the picker cross sectional diameter 116.

A tension spring, rubber band, O ring or endless latex band 68 is hooked or attached to the picker finger 64 on the inside of the probe 38 and fits doubly around the mounting sleeve 114, the pivoting sleeve (threaded) 72 and the pivoting sleeve (countersunk) 70.

Figure 4:
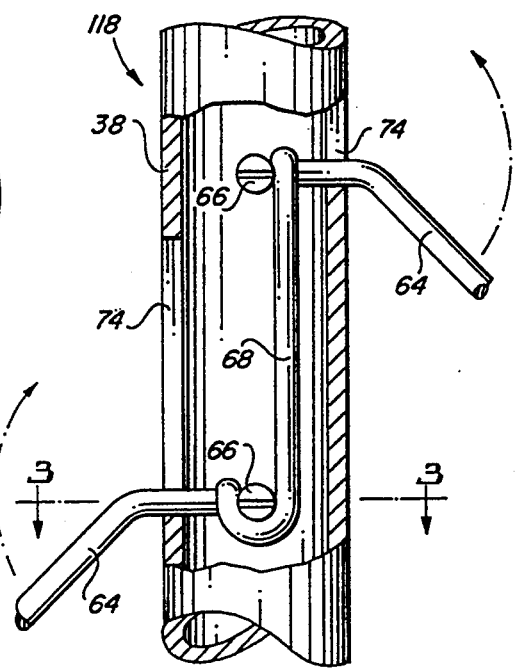
FIG. 4 is a cut away view of the probe and the means of mounting the picker finger inside the probe.

In reference to FIG. 4, the latex band 68 is extended under tension and hooked around the picker finger 64 of another identical picker finger assembly unit 118 as depicted in FIG. 3 and described above. The protruding part of the picker finger 64 in both cases are diametrically opposed and having the picker finger 64 in the same plane pointing in the same direction like unto an arrow head. The latex band 68 is used in pairs with the picker finger assembly 118. These pairs may have the protruding parts pointing radially outward in any chosen direction.

More units of the picker finger assembly 118 are provided on the probe 38 as depicted in FIG. 5. The probe 38 has a slick, low friction, smooth, pathfinder cone 76 affixed to the free end of the probe 38. The position of the pathfinder cone 76 in relation to the picker finger assembly 118 is shown too.

FIG. 14 shows how special provision is made by having a sleeve, bushing or carriage mounting fixed to the carriage 50. A pivoting shaft, or pivot bolt 120 connects the attachment bracket 84 pivotal to the carriage 50. The center line of a drive shaft 80 corresponds to the center line of the pivot bolt 120. The attachment bracket 84 is further connected to the roller chain 48 via special provision to fit to the links of the roller chain 48 in such a fashion that the distance from the center line of the pivot bolt 120 to the center line the roller of the roller chain 48 is substantially equal to half the pitch circle diameter of a drive sprocket 82 of the roller chain 48. Also see FIG. 13.

Figure 11:
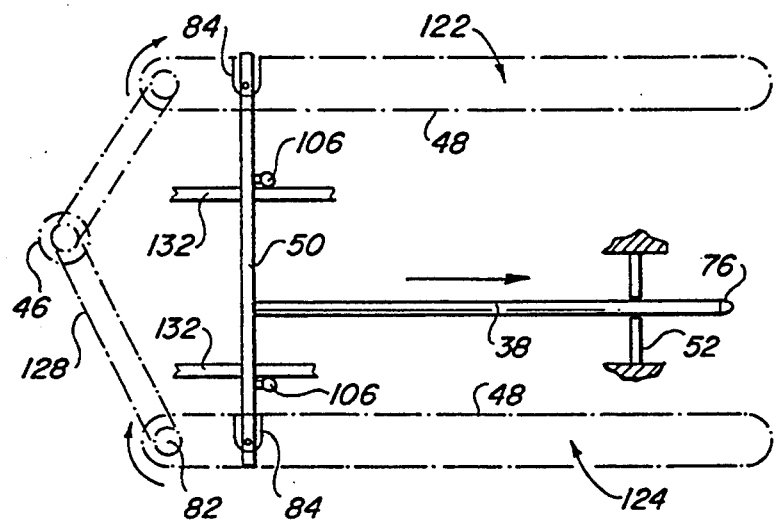
FIG. 11 is a side view of the driving mechanism during the extension cycle.
Figure 24:
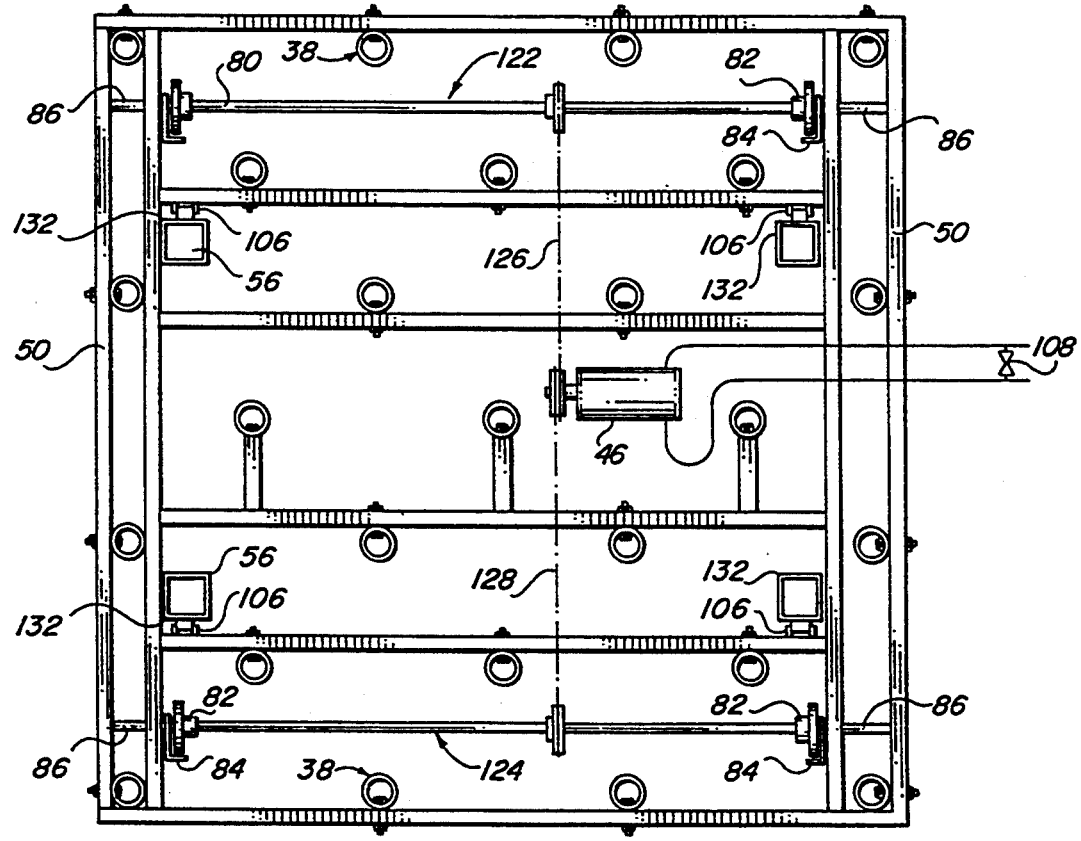
FIG. 24 is a typical cross section view of the carriage, its drive and support, the plane of which is indicated by line 24—24 in FIG. 12.

Referring to FIGS. 11 and 24 four shafts 80 are provided and the roller chain 48 connecting these into two pairs of identical drive units 122 and 124. The top drive unit 122 and the bottom drive unit 124 are connected via a roller chain 126 from the top drive unit 122 and another roller chain from the bottom drive unit 124 to a drive unit, engine, motor gearbox or hydraulic motor 46. Hydraulic motor 46 is typically powered by tractor 30. Hydraulic motor 46 has an hydraulic relieve valve 108 connected in parallel to the oil circuit.

In reference to FIG. 11 which shows a simplified diagram of mounting, guiding and moving of a series of the probes 38. A grid, support, guide 52 comprises a structure with openings through which a series of probe 38 can protrude. The guide 52 is stationary in relation to and connected to a tilt frame 56. The probes 38 are connected to the carriage 50.

FIG. 2 shows that the tilt frame 56 is pivotal connected to a toolbar 36 and toolbar 36 to a tractor 30, as shown in FIG. 1. The base end of the probe 38 opposite to the pathfinder cone 76 is connected by a single bolt to a movable grid or carriage 50. The positions where the probe 38 are connected correspond to the pattern of openings in the guide 52. Consequently this series of the probe 38 are all connected to the carriage 50 and guided by the guide 52 in the same fashion.

FIG. 2 shows how this series of the probe 38 are orientated.

In reference to FIG. 24, the carriage 50 is typically supported by a number of bearings, wheels, low friction pads or bearing rollers 106. These bearing roller 106 use the tilt frame 56 as a race way 132. The carriage 52 can be moved both directions along a straight line indicated by the members of the tilt frame 56 and supported by the bearing roller 106. Typically the carriage 50 is connected in four positions via a special, bracket or attachment bracket 84 to a roller chain 48.

Figure 15:
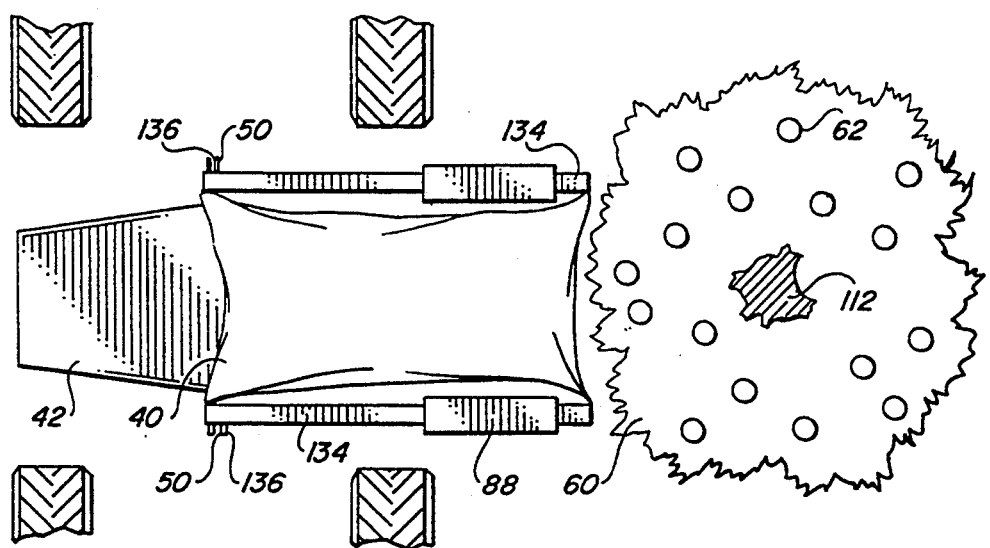
FIG. 15 is a plan view of the catching device being fully withdrawn.
Figure 16:
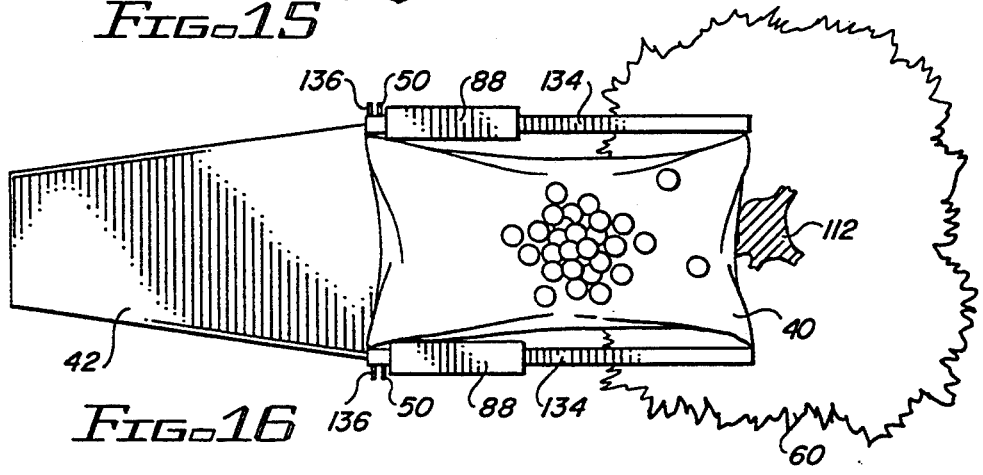
FIG. 16 is a plan view of the catching device being fully extended.

In reference to FIG. 15 and 16, the catcher frame 134 is connected to the carriage 50 by means of two protruding hitch brackets 136. This the hitch bracket 136 connects a part of the carriage 50 between them and any movement of the carriage 50 in the direction of the axis of the telescopic support 88 and the catcher frame 134 will be transferred to the catcher frame 134. A canvas, tarpaulin, cloth or catcher 40, is suspended at the corners by the catcher frame 134. The distance between the center lines of the catcher frame 134 are greater than the width of the carriage 50. The catcher 40 is located substantially below a plurality of probes 38 not shown in FIGS. 15 and 16.

Referring to FIG. 2, a canvas, tarpaulin or sheet metal is formed into a catcher funnel 42 that is suspended by the tilt frame 56 and the footrest 54. The catcher funnel 42 is positioned partly under catcher 40 with the funnel end facing towards a pivot center line of a hinge 138.

Figure 17:
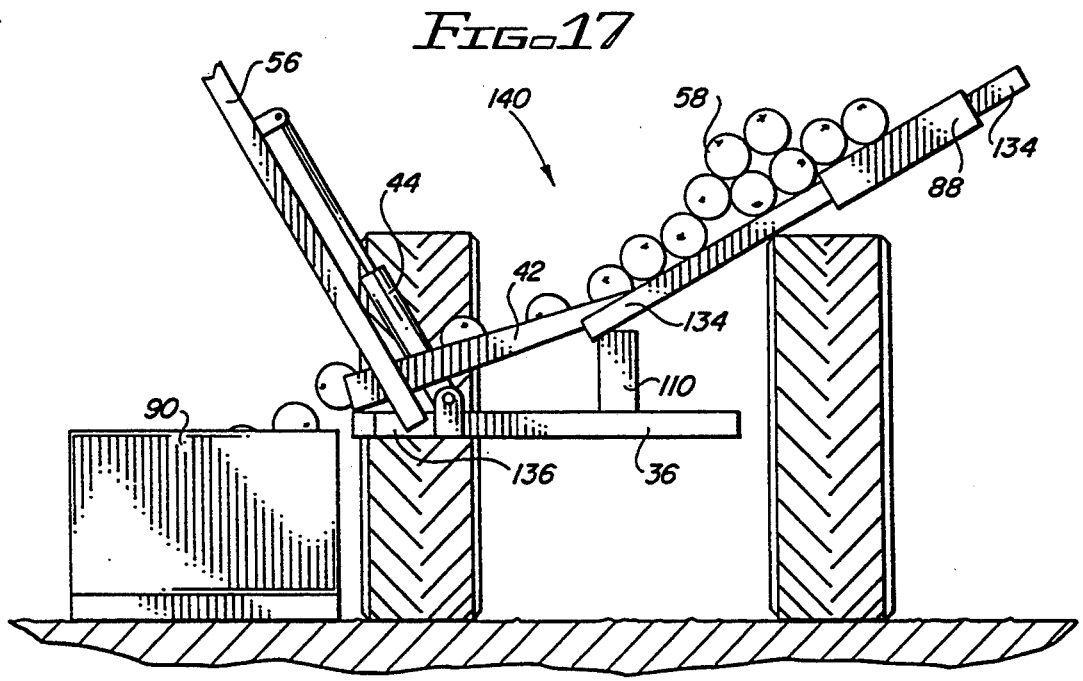
FIG. 17 is an end view of the catching device being emptied.

In reference to FIGS. 2 and 17, all of the carriage 50, the guide 52, the catcher frame 134 and catcher 40 referred to as the picker-catcher assembly 140, of which the tilt frame 56, an integral part, is pivotal joined to a tilt hinge 138. FIG. 17 illustrates how the complete the picker-catcher assembly 140 can be tilted by the utilization of an hydraulic tilt cylinder 44.

Further referring to FIG. 1, the picker-catcher assembly 140 is connected to a main frame, beam, cantilever or toolbar 36. Toolbar 36 is connected pivotal to a distant piece, positioning arm or positioning double hinge 34. An hydraulic cylinder 32A is connected to toolbar 36 and the positioning double hinge 34. The positioning double hinge 34 is connected pivotal to a hook up facility or tractor hitch 110 which in turn is connected to a tractor 30. Another hydraulic cylinder 34B is pivotal connected to the positioning double hinge 34 and the tractor hitch 110.

Further in reference to FIG. 2 the drive shaft 80 is connected via bearings to the tilt frame 56. A support, stand or foot 54 is connected to the tilt frame 56 and forms an integral part of the tilt frame 56. A cylindrical telescopic support member 88 having its axis parallel to the raceway 132, is provide on each side of the tilt frame 56 and rigidly connected to the tilt frame 56 and the footrest 54. The length of the telescopic support 88 is sufficient to support another cylindrical member, pipe, tube or catcher frame 134, having an outer diameter smaller than the inner diameter of the telescopic support 88 and fits telescopically into the telescopic support 88. The length of the catcher frame 134 is sufficient to allow the catcher frame 134 to move telescopically in the telescopic support 88 for a distance at least equal to the center lines of the top drive unit 122 which is equal to the same distance of the bottom drive unit 124 in FIG. 11.

From the description above, a number of advantages of my fruit picker become evident:
(a) A simple design will allow a manufacturer to manufacture this picker with the basic tools, thus saving manufacturing cost.

(b) Simplicity reduces operating cost. The only wear and tear part, the probe, can be replaced within 45 seconds.

(c) The energy requirement of this machine is extremely low compared to pneumatic shakers.

(d) Only one operator is required to fully mechanize the harvesting operation.

(e) The ability and ease to position the picker around the canopy of the tree ensures that all fruit will be exposed to the picker.

(f) The emphasis of my picker is very much placed on minimizing mechanical damage to trees. The flexible probes, pathfinder cones, sunken picker finger pivots, non torque increasing swing away of the fingers and the hydraulic adjustable effort by which the prongs are inserted confirms this important feature.

(g) The catcher that is an integral part of the picker always follows the picking devices to ensure that the absolute minimum number of fruit is spilled in the ground.

(h) The cost of this fruit picker in comparison to more sophisticated high tech endeavors by previous inventors make it even more attractive.

(i) The rate of picking fruit with this picker is by far superior to other methods previously patented.

OPERATION—FIGS. 1–12 AND 15–22

In reference to FIG. 11 hydraulic motor 46 drives the carriage 50 via main drives 126, 128 and 122, 124 to cause it to perform a reciprocating movement. In reference to FIG. 2 the plurality of prongs 38 and a catcher 40 that are connected to the carriage 50 and guided by guide 52 performs the same reciprocating movement. A series of picking finger assemblies 188 mounted on the probes 38 penetrate the tree 60 engage fruit stems and pick the fruit. The picked fruit 58 drop onto the catcher 40 which perform the same movement as the probes. When the capacity of the catcher 40 is filled a tilt cylinder 44 is activated to tilt the complete picking-catching device 140 to be tilted as depicted in FIG. 17. Picked fruit 58 then rolls from the catcher 40 onto a funnel 42 and be discharged in to a container or bin 90.

In reference to FIG. 3 the probe 38 is typically made of a light-weight-low-cost-low-friction-flexible material such as a PVC pipe. No lubrication of pivot bushes 70 and 72 is required. The pivoting sleeve (countersunk) 70 and the pivoting sleeve (threaded) 72 being held together by the countersunk bolt 66 holds together the mounting sleeve 114 between them to form a unit. The pivoting sleeve (countersunk) 70 and the pivoting sleeve (threaded) 72 also acts as a bush or bearing and locate the picker finger 64 in the probe 38. No parts of the countersunk bolt 66, the pivoting sleeve (countersunk) 70 or the pivoting sleeve (threaded) 72 protrude from the outer surface of the probe 38, thus providing a smooth surface that will not cause any mechanical damage to fruit and limbs. The protruding part of the picker finger 64 that is located in the slotted hole 74 locates the picker finger assembly 118 and prevents movement along the pivot axis of the picker finger assembly 118.

Another embodiment of the picker finger assembly 118 not shown here is to have the hole in the pivoting sleeve (threaded) 72 and the pivoting sleeve (countersunk) 70 eccentric in relation to the center line of the outer cylindrical surface, thus providing unlimited adjustability of the size of the throat area 144 and the angle of attack 142 angle as depicted in FIG. 10.

In FIG. 4 it can be noticed that the slotted hole 74 is placed in relation to the picker finger assembly 118 so as to act as a stop for the free end of the picking finger 64 under the urging force of the latex band 68. The length of the slotted hole 74 is sufficient to allow picker finger 64 to be housed temporarily inside the probe 38 during a swing away which may be caused by a tree limb 78. This retraction of the picker finger 64 ensures that an obstacle may totally be avoided. The latex band 68 is being pulled around the pivot assembly in order to force the picker finger 64 up against the end of the slotted hole 74. The other side of endless the latex band 68 is anchored under strain around an adjacent the picker finger assembly 118 with in the same result. This pre tension is selected to be sufficient for the picking of the fruit but small enough to be swung away should it encounter a tree limb 78. See the swing away in FIG. 5.

The spring, the latex band 68 is pulled around the pivoting sleeve (countersunk) 70 and the pivoting sleeve (threaded) 72 during a swing away and increases the length of the latex band 68 only slightly. Also the lever arm of the force in the latex band 68 remains constant being wrapped around the cylindrical pivoting sleeve (countersunk) 70 and the pivoting sleeve (threaded) 72. These two factors result in negligible torque increase during a swing away which help reduce potential damage that the picker finger 64 can do to the tree.

Referring to FIG. 10 fruit hanging by a stem from a fruit tree is directed by the picker finger 64 during a relative movement of it in relation to the fruit toward the throat area 144. The stem engages in this reducing passage until the stem meets with the picker finger 64. The fruit get forced up against the probe 38 and the picker finger 64 and while the movement continues the force overcomes the force offered by the fruit-stem connection and it dislodges.

An embodiment of the picker finger assembly 118 is shown if FIG. 5. This embodiment result in a single picking action, penetrating the canopy like an arrow and picking fruit during the withdrawal cycle.

Another embodiment of the picker finger assembly 118 is shown if FIG. 6. This embodiment result in a double picking action; picking fruit during the penetration and withdrawal cycles making the machine more time efficient. The double picking action reduces the number of reciprocating cycles required to pick all fruit thus limiting mechanical damage to the tree.

In reference to FIG. 8 the size of the picker finger 64 matches that of mature fruit 58 and the fruit is picked. The situation depicted in FIG. 9 shows a smaller or immature fruit 62 which slips through the throat area and is not picked.

FIG. 10 shows a small fruit being combined with a smaller picker finger 64 that results in picking the fruit. Thus adjustability and selectability in fruit size is accomplished.

Figure 13:
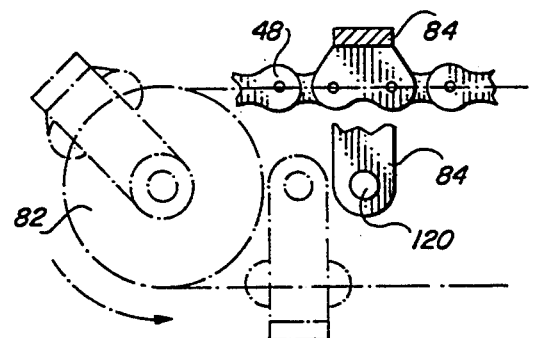
FIG. 13 is a side view of the attachment device.

FIGS. 13 and 14 illustrates an embodiment of how the carriage 50 can be connected to the roller chain 48 on order to follow the roller chain 48 throughout it complete trip around a pair of the sprockets 82. This embodiment transforms rotation of the drive shaft 80 to translation of the carriage 50. The fact that the center line of the pivot bolt 120 corresponds with that same of the drive shaft 80, the attachment bracket 84 simply follows the path of the roller chain 48 around the sprocket 82 and thus change the direction of movement of the carriage 50 with out having to change the direction of rotation of the drive shaft 80 or the hydraulic motor 46. This results in simplified and smooth operation.

Figure 12:
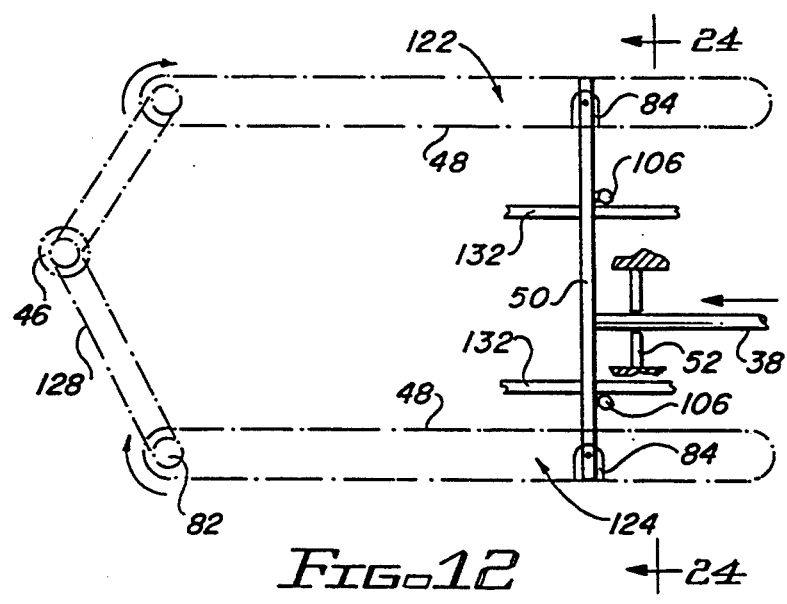
FIG. 12 is a side view of the driving mechanism during the withdrawal cycle.

FIG. 11 shows the hydraulic motor 46 which is used to drive the top drive unit 122 and the bottom drive unit 124. The ratio is such that the speed of the top drive unit 122 to the bottom drive unit 124 equals 1:1. The positive connection of the top main drive chain 126 and the bottom main drive chain 128 ensures that they can be set in a predetermined non changing relation to each other. The top main drive chain 126 and the bottom drive unit 124 in turn drive the top drive unit 122 and the bottom drive unit 124. The ratio again is 1:1. The carriage 50 being connected via the attachment bracket 84 to the top drive unit 122 and the bottom drive unit 124 is caused to perform a reciprocal movement, the reach of which is equal to the center line of a pair of the drive shaft 80. A series of probes 38 which is connected to the carriage 50 performs the same reciprocal movement, while being guided by a stationery the guide 52. FIG. 12 shows the withdrawal cycle of the series of probes 38. The carriage being supported by roller bearings 106 and using part of the frame 56 as raceway 132 for bearings 106. The carriage cannot alter the direction of it course during any one cycle seeing that the same is well guided by a plurality of bearing rollers 106. If any lateral movement of the carriage take place it will result in lateral movement of the extended probes and may result in excessive damage to the tree. The configuration in FIG. 11 achieves exactly that and ensures that the probes are extended and withdrawn in exactly the same path.

Also further with reference to FIG. 11 the probes may be subjected to material stresses at its base if simply connected rigid to the carriage 50 without a guide 52 to support throughout the extend of its reciprocal movement. This embodiment avoids the same.

Figure 7:
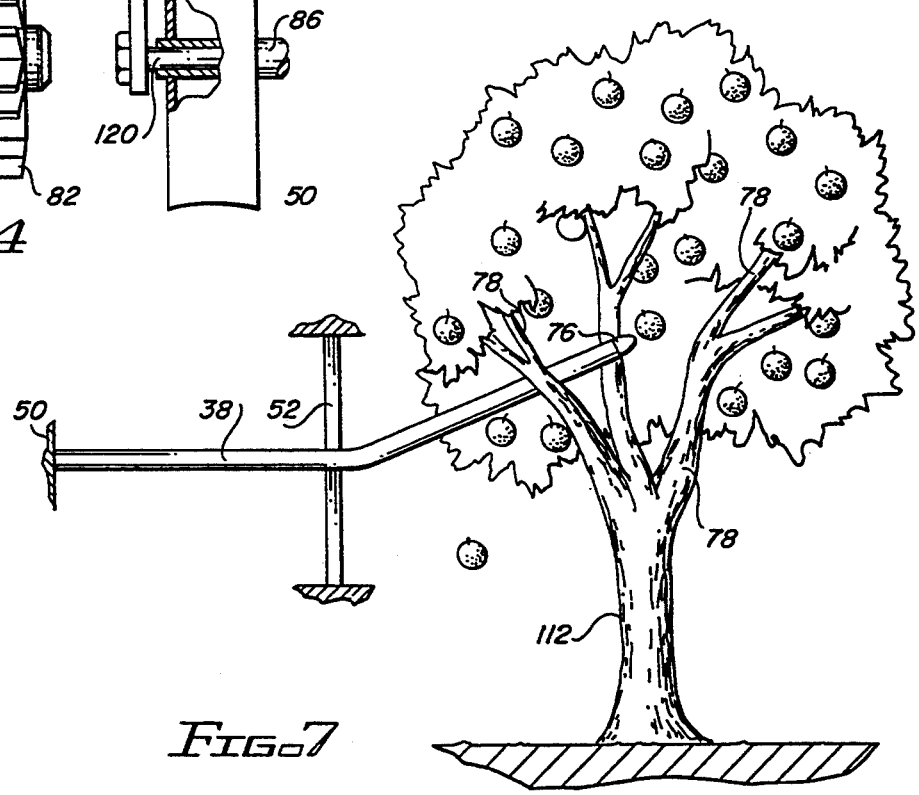
FIG. 7 is an end view of the probe being flexed to bypass obstacles like branches and limbs.

Referring to FIG. 7, the function of the flexibility of the probe 38 and of the pathfinder cone 76 mounted at the end is illustrated. As the probe 38 is penetrating the canopy as a result of the movement of the carriage 50, each the probes 38 finds its way pass limbs, fruit and twigs. The flexible characteristic of the probe 38 helps to accommodate forced misalignment without damage to the tree or machine. The hydraulic relieve valve 108 shown in FIG. 26 is a further safety precaution to help slow down or stop the hydraulic motor in the event of an obstacle or tree limb 78 that can not be avoided.

Another embodiment not shown here represent a different phasing of the top drive unit 122, the bottom drive unit 124 and the carriage 50 in relation to each other. This arrangement may result in changing the timing at which the probes relative to each other penetrating the canopy. That is that some may be withdrawn at the same time when some are penetrating the tree canopy of the fruit tree 60. The benefits of this arrangement is amongst others is to prevent the limbs from being "bulldozed" by a "wall" of penetrating the probe 38. This feature may also reduce the amount of pull on limbs thus reducing mechanical damage.

In reference to FIGS. 15 and 16, the catcher frame 134 that is connected via the hitch bracket 136 to the carriage 50 performs the same reciprocal movement as the carriage 50 and consequently the series of the probe 38. the telescopic support 88 supports the catcher frame 134 and is stationary relative to the tilt frame 56 and the footrest 54. The catcher funnel 42 is located partly underneath catcher 40 and is stationary in relation to the catcher. Seeing that catcher 40 does not incorporate any rigid members at the extending end it can be extended all the way to the tree trunk 112 with out causing damage to it. Consequently reducing of eliminating the spill of picked fruit.

In reference to FIG. 2, the picked fruit 58 drop on catcher 40 as it finds its way down through the series of the probe 38 and limbs. The slowing down effect of the series of the probes 38 and the limbs and leaves prevent the fruit from gaining too high a velocity when dropping and also guide the picked fruit 58 down to be intercepted by catcher 40. The catcher 40 is always under the picker finger assembly 118 since it performs the same reciprocating movement and is in phase with the probes 38. In an embodiment not shown here, catcher 40 and the catcher frame 134 can be controlled separately from the carriage 50. Picked fruit 58 gather in catcher 40 until the buffer store capacity of the catcher 40 is filled.

Figure 18:
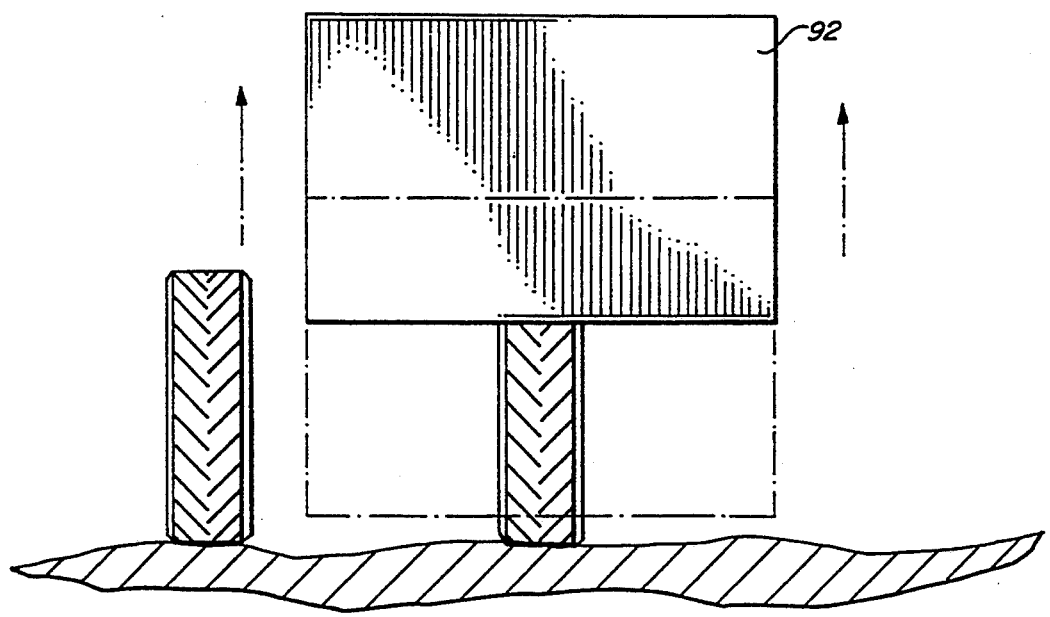
FIG. 18 is a diagrammatic end view of the picking device being positioned vertically.

Further in reference to FIG. 18, the picker is raised to the elevation of a fruit bin 90 in FIG. 17. FIG. 17 further illustrates how the picker-catcher assembly 140 is tilted by the hydraulic tilt cylinder 44 to cause picked fruit 58 to roll onto the catcher funnel 42 and be guided by the catcher funnel 42 toward its funnel end and be discharged into the fruit bin 90.

Figure 19:
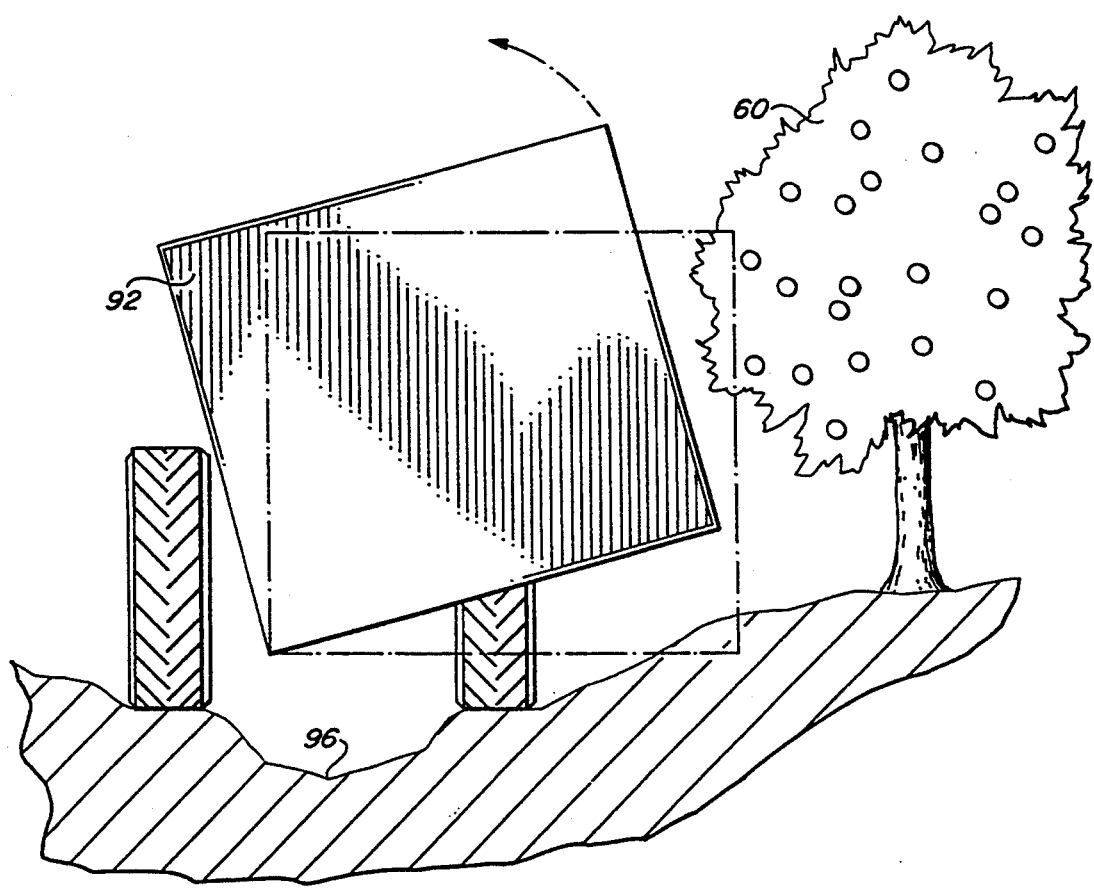
FIG. 19 is a diagrammatic end view of the picking device being angularly adjusted in the vertical plane.

Some fruit may be difficult to reach or is simply not exposed to being picked. The repositioning of tractor 30 in the horizontal plane and or the repositioning of the picker-catcher assembly 140 in the vertical plane using the hydraulic lift of tractor 30 as shown in FIG. 18 and or using the hydraulic tilt cylinder 44 as shown in FIG. 19 may help expose unpicked fruit 62 to the picker finger assembly 118. The tilt cylinder 44 may also be using to aim the picket at trees planted on a planting bed 94 as depicted in FIG. 19. Thus adjustability by the tractor operator is made with ease.

In reference to FIG. 1, the positioning double hinge acts as an adjustable distant piece or arm between the tractor hitch 110 and toolbar 36. The relative position of toolbar 36 to the tractor hitch 110 can be altered by the use of toolbar portioning cylinder 32A and the hitch positioning cylinder 32B. This ability enables the operator to reposition the picking-catching device (diagrammatic) 92 to be able to perform among others the various positions of the picking-catching device 92 in relation to the fruit tree 60 as shown in FIGS. 20 through 23. This feature assists to pick thoroughly.

Figure 20:
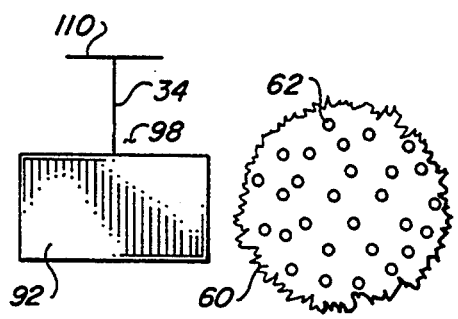
FIG. 20 is a diagrammatic plan view of the picking device showing the positioning device in the normal mode.
Figure 21:
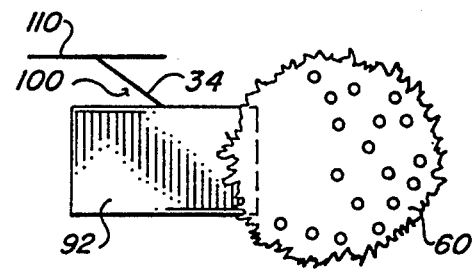
FIG. 21 is a diagrammatic plan view of the picking device showing the positioning device in the sideways extended mode.
Figure 22:
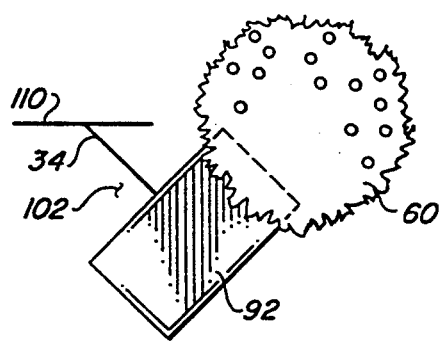
FIG. 22 is a diagrammatic plan view of the picking device showing the positioning device in the sideways forward mode.
Figure 23:
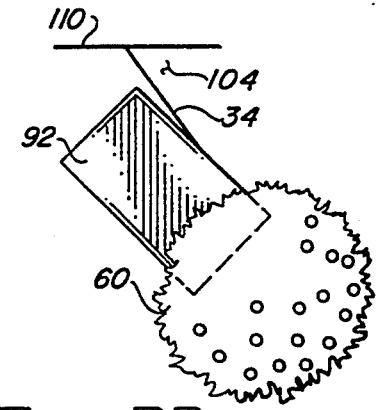
FIG. 23 is a diagrammatic plan view of the picking device showing the positioning device in the sideways backward mode.

If it be assumed that FIG. 20 represents the normal position 98 of the hinge 34 then the reach of the probe 38 can effectively be increased by adjusting the toolbar positioning cylinder 32A for positioning toolbar and the hitch positioning cylinder 32B to achieve the position shown in FIG. 21. This position may be referred to as the extended position 100 and may be used to effectively increase the reach of the reciprocal movement without having to reposition the tractor 30.

In order to do the least amount of damage to a tree the probe 38 should always be inserted and withdrawn radially in relation to the trunk. This way limbs are not twisted and possibly torn. This purpose is achieved by activating the toolbar positioning cylinder 32A for positioning toolbar and the hitch positioning cylinder 32B to achieve the positions shown in FIGS. 22 and 23. The position shown in FIG. 22 may be referred to as the forward position 102. Likewise the position shown in FIG. 23 may be referred to as the backward position 104.

Another embodiment not shown here is to omit the positioning double hinge, the toolbar positioning cylinder 32A for positioning toolbar and the hitch positioning cylinder 32B and thus hitching the toolbar 36 directly to the tractor hitch 110 to tractor 30. This embodiment will not have the angular and positional adjustments shown in FIGS. 20–23. This is a more simple application and my be satisfactory if the fruit trees are grown in a hedge.

Yet another embodiment not shown her is to supply a rest or foot to the tractor hitch 110 in order to stabilize tractor 30 during positional and angular adjustment as shown in FIGS. 20–23.

SUMMARY, RAMIFICATIONS and SCOPE

Accordingly, the reader will see that the fruit picker of this invention can be used to pick fruit in a very simple and effective way.

- Great emphasis is placed on providing a tree friendly picker. All possible causes of mechanical damage is researched and avoided in this picker.
- The picker is of straight forward and simple construction and design in order to have the minimum maintenance requirement that can easily be provided in the farm workshop.
- The picker can easily be repositioned during the end of the withdrawal cycle and before the next penetration cycle in order to create an adjustment of the position of the picking finger relative to an unpicked fruit in order to pick the same.
- An unlimited number of positioning adjustment can be with great ease to the operator.
- Virtually no number of picked fruit is not intercepted by the catcher as a result of having the catcher always automatically where the picking takes place.
- The energy requirements to operate the picker is minimal.
- No chemicals are associated with the picking of fruit if this invention is employed to pick fruit.
- The relative low cost of this machine and the resulting savings in harvesting cost will improve the profit margin of the grower.

Although the description above contains many specifications, these should not be construed as limiting to the scope of the invention but as merely providing illustrations of some of the presently preferred embodiments of this invention. For example, the picker unit comprising the probes, can have any shape, size and orientation, it may not be combined with the catching attachment or may be boom mounted.

Thus the scope of the invention should be determined by the appended claims and their legal equivalents, rather than by the examples given.

I claim:

1. An apparatus for picking fruit comprising:
a plurality of probes, each probe defining a base end and a free end, each said probe having a plurality of picking fingers,
a structural means for supporting the base ends of said probes,
an extensible means for extending said probes back and forth along a generally parallel path,
each said probe having a longitudinally extending slot therein,
said picking fingers each having a base portion and a shaped free terminal portion extending substantially through said slot,
the said base portion being attached to a plurality of cylindrical bushings, said bushings connecting together said base portion, and said bushings further locating said base portion and said cylindrical bushings pivotal in diametrically opposed holes in said probe,
an urging means for holding said picking finger in a predetermined position in relation to said probe, wherein pivotal movement of said picking finger is opposed by said urging means; and
wherein said urging means is connected to said base portion of two adjacently located picking fingers.

2. The device of claim 1 wherein said urging means comprises an endless latex band that is connected to said base portions of said adjacently located picking fingers whereby said latex member may be drawn around said cylindrical bushes during an encounter with a limb and thus insignificantly increasing torque on said picking finger.

3. An apparatus for picking fruit comprising:
a) a plurality of probes, each probe defining a base end and a free end, each said probe having a plurality of picking fingers;
b) a structural means for supporting the base ends of said probes whereby the free end of each said probe is substantially supported while the probe is moved in a direction generally paralleling the probe,
c) an extensible means for extending said probes back and forth along a generally parallel path, the extensible means including a carriage with the base end of each probe connected thereto and a driving means transforming rotation into translation whereby the carriage is reciprocated along a direction generally paralleling said probe thereby causing the probe to perform a reciprocal movement while the free portions of each probe are substantially extended while being supported by the supporting structure, wherein said driving means further comprises:
a plurality of roller chains and sprockets rotatably driven by an external propulsion means,
a plurality of attachment brackets whereby said roller chains are pivotal connected to said carriage on a plurality of positions substantially sufficient to support and move said carriage whereby the center line of said pivotal connecting substantially coincide with centerline of said sprockets whereby said attachment brackets being driven by said roller chain may cause said carriage to perform a cyclical reciprocal movement generally parallel to said probes.

4. The device of claim 3 further comprising bearing rollers whereby said carriage is supported.

* * * * *